United States Patent
Ma et al.

(10) Patent No.: US 11,784,934 B2
(45) Date of Patent: Oct. 10, 2023

(54) METHOD AND APPARATUS FOR CONTROLLING CONGESTION BASED ON GEN-Z INTERFACE

(71) Applicant: Electronics and Telecommunications Research Institute, Daejeon (KR)

(72) Inventors: Jin-Suk Ma, Daejeon (KR); Song-Woo Sok, Daejeon (KR); Myeong-Hoon Oh, Daejeon (KR); Hag Young Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 55 days.

(21) Appl. No.: 17/520,439

(22) Filed: Nov. 5, 2021

(65) Prior Publication Data

US 2022/0174015 A1    Jun. 2, 2022

(30) Foreign Application Priority Data

Dec. 1, 2020   (KR) .......................... 10-2020-0165883

(51) Int. Cl.
*H04L 47/2408*     (2022.01)
*H04L 47/28*     (2022.01)

(52) U.S. Cl.
CPC .......... *H04L 47/2408* (2013.01); *H04L 47/28* (2013.01)

(58) Field of Classification Search
CPC ... H04L 47/2408; H04L 47/28; H04L 47/115; H04L 47/24
See application file for complete search history.

(56) References Cited

U.S. PATENT DOCUMENTS

| | | | |
|---|---|---|---|
| 7,051,195 B2 | 5/2006 | Gaither et al. | |
| 9,224,452 B2 * | 12/2015 | Dong | ...................... G06F 12/08 |
| 10,789,090 B2 | 9/2020 | Koh et al. | |
| 11,329,890 B2 * | 5/2022 | Pampaiah | .............. G06N 20/00 |
| 2013/0215733 A1 * | 8/2013 | Jiang | ...................... H04L 47/12 |
| | | | 370/216 |
| 2020/0151118 A1 | 5/2020 | Jeong et al. | |
| 2020/0186471 A1 | 6/2020 | Shen et al. | |

FOREIGN PATENT DOCUMENTS

| | | |
|---|---|---|
| KR | 1020120054142 A | 5/2012 |
| KR | 1020170057771 A | 5/2017 |

OTHER PUBLICATIONS

Hong et al, "Implementation and Analysis of a memory-semantic interconnect based on Gen-Z Protocol" 2020 (Year: 2020).*

(Continued)

*Primary Examiner* — Omer S Mian
(74) *Attorney, Agent, or Firm* — William Park & Associates Ltd.

(57) ABSTRACT

Provided are a method and an apparatus for controlling congestion based on a generation Z (Gen-Z) interface. When a first device receives, from a second device, a second packet that is a response to a first packet transmitted to the second device, and the second packet indicates that a congestion situation occurs, the first device records priority information of a packet in a predetermined field for congestion control among fields according to the Gen-Z interface. Then, the first device transmits a third packet including priority information to the second device.

16 Claims, 11 Drawing Sheets

(56) References Cited

OTHER PUBLICATIONS

Brunner, "Formal Verification and Modelling of the Gen-Z Specification", ETH Zurich, 2020 (Year: 2020).*
GenZ Core Specification v1.0, Gen-Z Consortium pp. 1-250 (Year: 2018).*
GenZ Core Specification v1.0, Gen-Z Consortium pp. 251-500 (Year: 2018).*
GenZ Core Specification v1.0, Gen-Z Consortium pp. 501-750 (Year: 2018).*
GenZ Core Specification v1.0, Gen-Z Consortium pp. 750-1014 (Year: 2018).*
Gen-Z Core Specification, Version 1.1, pp. 1-1041, 2019, Gen-Z Consortium.

* cited by examiner

METHOD AND APPARATUS FOR CONTROLLING CONGESTION BASED ON GEN-Z INTERFACE

CROSS-REFERENCE TO RELATED APPLICATION

This application claims priority to and the benefit of Korean Patent Application No. 10-2020-0165883 filed in the Korean Intellectual Property Office on Dec. 1, 2020, the entire contents of which are incorporated herein by reference.

BACKGROUND OF THE INVENTION

(a) Field of the Invention

The present disclosure relates to congestion control, and more particularly, to a method and an apparatus for controlling congestion based on a generation Z (Gen-Z) interface.

(b) Description of the Related Art

Recently, due to the advancement of Internet technology, a new type of workload other than the existing web search has appeared in various ways. Unlike on-line transaction processing (OLTP) transactions for existing Internet services, the new type is an Internet service that is provided using unstructured data which is created in a form of short, sporadic, and sudden bursts data.

The internal packets that drive these services have a small packet size, an unstructured type of data configuration, and have characteristics to process a huge amount of data in a short time.

A new computing paradigm that can efficiently process such data is called data-centric computing. In order to support data-centric computing, a Gen-Z interface technology that implements a large-capacity, low-latency memory pool technology is being developed.

In order to process various workloads and perform Internet services, first, when receiving data input from a user and running application software for performing a predetermined service, if a device using the Gen-Z interface standard is used, the internal resources of the Gen-Z interface-based device are exhausted due to an instantaneous increase of the workload by service users, and thus a saturation situation may occur instantaneously and congestion may occur in terms of packets. In fact, in terms of service, the service requested by the user is temporarily suspended, resulting in a very poor service quality.

In order to control such a case, since the Gen-Z interface standard only includes very limited rules for congestion control, a more efficient congestion control method is required.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a method and apparatus having advantages of more efficiently controlling congestion occurring in a device based on the Gen-Z interface standard.

An exemplary embodiment of the present invention provides a method for controlling congestion in an environment in which a first device and a second device transmit and receive packets based on a generation Z (Gen-Z) interface. The method includes: receiving, by the first device, from the second device, a second packet that is a response to a first packet transmitted to the second device; recording, by the first device, priority information of a packet in a predetermined field for congestion control among fields according to the Gen-Z interface when the second packet indicates that a congestion situation occurs; and transmitting, by the first device, the packet including the priority information as a third packet to the second device.

In an implementation, the recording of priority information may include recording the priority information in a vendor-defined structure field according to the Gen-Z interface standard.

In an implementation, the recording of priority information may include: recording that congestion control is performed according to a vendor-defined value in congestion management structure (CMS) fields according to the Gen-Z interface standard; and recording the priority information in the vendor-defined structure field.

In an implementation, the recording of that congestion control is performed may include: setting a value of a Congestion CAP1 field among the CMS fields to a value supporting vendor-defined congestion control; setting a value of a predetermined bit of a Congestion CAP1 Control field among the CMS fields to a value for executing congestion control according to a vendor-defined value; and setting a value of Vendor-defined PTR among the CMS fields to a value of the vendor-defined structure field in which information for vendor-defined congestion control is defined.

In an implementation, the vendor-defined structure field may include a vendor-defined data field, and the vendor-defined data field includes a vendor-defined priority enable bit and a vendor-defined priority field.

In an implementation, a value indicating priority for each service may be recorded in the vendor-defined priority field, and the vendor-defined structure field additionally may include a type field indicating type information and a size field indicating a size.

In an implementation, the recording of priority information may include recording the priority information in a deadline field according to the Gen-Z interface standard.

In an implementation, the deadline field may include a first field in which priority information is recorded and a second field in which a deadline value is recorded.

In an implementation, the first field may include a priority enable bit and a priority encoding bit indicating priority.

In an implementation, the recording of priority information may include: recording the priority information in the first field of the deadline field; and recording a deadline value in the second field of the deadline field.

In an implementation, the recording the priority information in the first field may include activating the priority enable bit and using remaining bits of the first field as priority encoding bits to record priority when the first field includes the priority enable bit.

Another embodiment of the present invention provides a device in an environment in which a first device and a second device transmit and receive packets based on a generation Z (Gen-Z) interface. The device includes a memory and a processor configured to execute an instruction stored in the memory, wherein the processor is configured to execute the instruction to perform operations by: receiving, from the second device, a second packet that is a response to a first packet transmitted to the second device; recording priority information of a packet in a predetermined field for congestion control among fields according to the Gen-Z interface when the second packet indicates that a congestion situation occurs; and transmitting the packet including the priority information as a third packet to the second device.

In an implementation, the processor may be configured to perform recording the priority information in a vendor-defined structure field according to the Gen-Z interface standard when performing the operation of recording priority information.

In an implementation, when performing the operation of recording priority information, the processor may be configured to perform operations by: recording that congestion control that is performed according to a vendor-defined value in congestion management structure (CMS) fields according to the Gen-Z interface standard; and recording the priority information in the vendor-defined structure field.

In an implementation, when performing the operation of recording that congestion control is performed, the processor may be configured to perform operations by: setting a value of a Congestion CAP1 field among the CMS fields to a value supporting vendor-defined congestion control; setting a value of a predetermined bit of a Congestion CAP1 Control field among the CMS fields to a value for executing congestion control according to a vendor-defined value; and setting a value of vendor-defined PTR among the CMS fields to a value of the vendor-defined structure field in which information for vendor-defined congestion control is defined.

In an implementation, the vendor-defined structure field may include a vendor-defined data field, and the vendor-defined data field includes a vendor-defined priority enable bit and a vendor-defined priority field.

In an implementation, when performing the operation of recording priority information, the processor may be configured to perform an operation by recording the priority information in a deadline field according to the Gen-Z interface standard.

In an implementation, the deadline field may include a first field in which priority information is recorded and a second field in which a deadline value is recorded.

In an implementation, when performing the operation of recording priority information, the processor may be configured to perform operations by: recording the priority information in the first field of the deadline field; and recording a deadline value in the second field of the deadline field.

In an implementation, when performing the operation of recording the priority information in the first field, the processor may be configured to perform an operation by activating the priority enable bit and using remaining bits of the first field as priority encoding bits to record priority when the first field includes the priority enable bit.

DETAILED DESCRIPTION OF THE EMBODIMENTS

Figure 1:
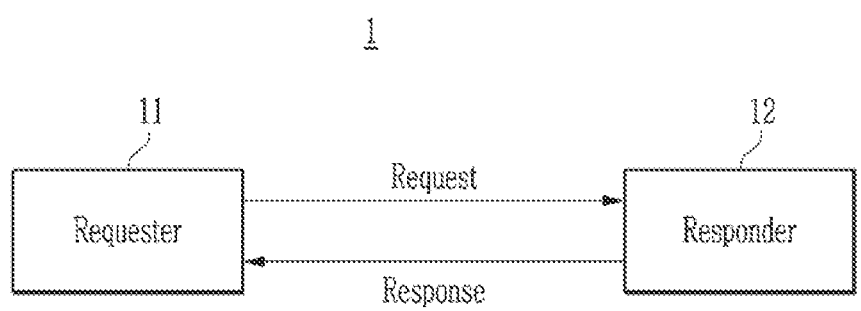
FIG. 1 illustrates an interface structure according to an embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, unless explicitly described to the contrary, the word "comprise", and variations such as "comprises" or "comprising", will be understood to imply the inclusion of stated elements but not the exclusion of any other elements.

The expressions described in the singular may be interpreted as singular or plural unless an explicit expression such as "one", "single", and the like is used. In addition, terms including ordinal numbers such as "first" and "second" used in embodiments of the present disclosure may be used to describe components, but the components should not be limited by the terms. The terms are only used to distinguish one component from another. For example, without departing from the scope of the present disclosure, a first component may be referred to as a second component, and similarly, the second component may be referred to as the first component Hereinafter, a method and an apparatus controlling congestion based on a generation Z (Gen-Z) interface according to an embodiment of the present disclosure will be described with reference to the drawings.

Unlike on-line transaction processing (OLTP) transactions for existing Internet services, various Internet-based services of a new type that did not exist in the past are Internet services that are provided using unstructured data which is created in a form of short, sporadic, and sudden bursts data. For example, there are social networks, photo processing, song recognition, web mashups, financial encryption, sensor network data, recommendation systems, ad hoc query, media transcoding and streaming, etc.

In addition, among various new Internet services, particularly a latency-critical service for which low latency performance is important includes, for example, social media, search engines, software-as-a-service (SaaS), online maps, machine translation, online shopping, advertising, financial data encryption, a real-time remote control system, etc. As existing services are improved or new areas are created, new services are continuously appearing.

In these services, in order to respond to query contents from a backend server of a web server that has received the simple query message as well as the request and response of the message that appears in the existing simple web search query operation, a vast amount of data post-processing is required In data-centric computing, which is a new computing paradigm that can efficiently process data, a Gen-Z interface technology that implements a large-capacity, low-latency memory pool technology is being developed.

The Gen-Z interface has the following structural advantages.

First, byte addressing is possible.

The Gen-Z interface allows local and remote nodes to access a shared target memory, which is a volatile or non-volatile memory device, in units of bytes, compared to the existing memory sharing technology mostly using block-based accesses.

Second, a standard that can be commonly used when accessing input/output (I/O) devices is provided.

Computing elements such as network cards, graphics cards, field programmable gate arrays (FPGAs), and digital signal processors (DSPs), which are widely used in the existing computing components, have their respective interface standards and operate attached to a computing node. Using the Gen-Z interface standard in these computing elements, it is possible to recognize and use a device with one common software standard. That is, when the Gen-Z interface standard is applied to the individual computing elements mentioned above, uniform mutual access is possible by using a Gen-Z command with individual devices.

Third, the multi-messaging function-Gen-Z interface provides a way to include multiple messaging packets within a single packet.

Fourth, a hardware accelerator approach is provided.

The Gen-Z interface supports coherent and non-coherent communication methods for hardware accelerators.

A method for supporting memory semantics or memory-centric communication has been developed when implementing a Gen-Z interface having such a structural characteristic and performing an operation for accessing a resource within a computing component.

The traditional memory access of the CPU is performed using a load/store instruction. The using a load/store instruction allows for computers to load and store data fastest. Also, dedicated instructions for I/O hardware other than memory resources are separately supported in the CPU. However, when I/O-dedicated instructions are used, not only does the overall bandwidth of a computing platform decrease, but also the access delay time is different due to the characteristics of I/O devices. Therefore, even if the same I/O instruction from the CPU occurs, it has a different delay time depending on the characteristics of a target I/O device and thus data of the target I/O device arrive at different times. Because of the hardware characteristics of these I/O devices, from the viewpoint of the operating system that needs to control hardware, a method for blocking a process of using resources of a computing system with a synchronization means or for using a spinlock and the like is used to increase efficiency in the use of resources in the computing system.

To effectively overcome the above-described problem, the Gen-Z interface designs and uses instructions similar to those of the above-described load/store method, and is implemented by using Gen-Z dedicated instructions when accessing a memory and I/O devices using the Gen-Z interface. It will be significant that this approach is designed and implemented in a way that standardizes memory sharing and supports it natively and structurally. Currently, Gen-Z interface version 1.0a has been completed, and the standard is provided only to companies that have joined the Gen-Z consortium.

FIG. 1 illustrates an interface structure according to an embodiment of the present disclosure.

Specifically, the interface according to an embodiment of the present invention is a Gen-Z interface, and the Gen-Z interface has a basic instruction transfer and return structure. The Gen-Z interface 1 designs instructions based on including a requester 11 generating an instruction and a responder 12 receiving and executing an instruction packet including the instruction. The instruction generated by the requester 11 is sent to the responder 12 in the form of a request, and the responder 12 executes the instruction sent in the form of a request, and when the instruction execution is completed, the requester 11 informs whether or not the instruction has been completed in the form of a response.

Figure 2:
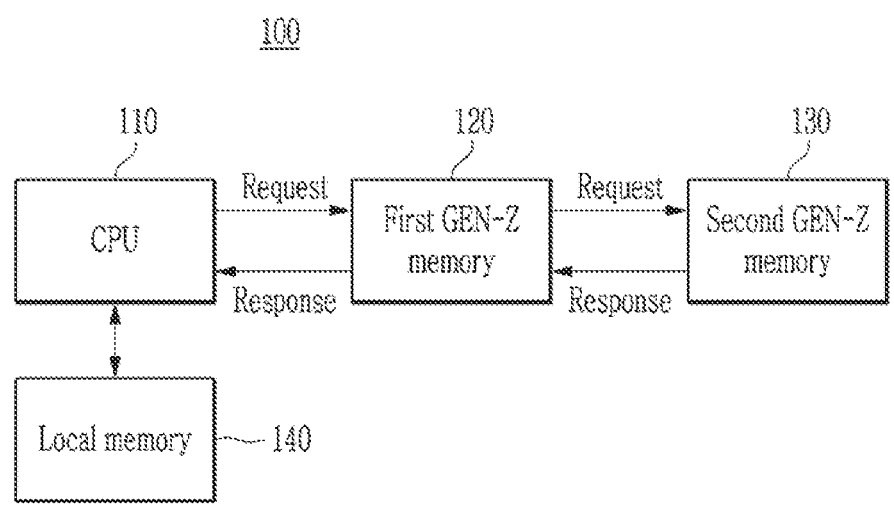
FIG. 2 is a diagram illustrating a structure of a processing apparatus with an interface standard according to an embodiment of the present disclosure.

FIG. 2 is a diagram illustrating a structure of a processing apparatus with an interface standard according to an embodiment of the present disclosure.

The processing apparatus 100 according to an embodiment of the present invention uses the Gen-Z interface, and includes, as illustrated in FIG. 2, a CPU 110, a plurality of Gen-Z memories 120 and 130, and a local memory 140. Here, two Gen-Z memories are exemplified, but the present invention is not limited thereto.

The CPU 110 becomes a requester, and the first Gen-Z memory 120 and the second Gen-Z memory 130 become responders. The CPU 110 is basically equipped with a local memory 140 for executing a program in a traditional computing structure. The local memory 140 is initialized at the moment when the CPU 110 starts a boot process using a boot loader, and the CPU 110 is configured to load a program on a hard disk, make the program in a process state execute the program, and load a page table for the process. In addition, in the case of a system using a built-in graphics processor inside the CPU, the local memory 140 may be configured to store a graphics memory page table and graphics memory data of a graphics processor.

As the use of applications such as big data programs and machine learning programs that are driven while generating large amounts of data in the program itself becomes common, memory shortages occur with only existing local memory. Accordingly, there are cases in which it is difficult to quickly execute a program.

However, since the maximum capacity of the local memory 140 is predetermined when designing a main board equipped with a CPU, there is a limit to the size of the acceptable memory of the local memory 140. To solve this, the memory using the Gen-Z interface is added to the main board. Accordingly, the processing apparatus 100 includes a first Gen-Z memory 120 and a second Gen-Z memory 130 as shown in FIG. 2. The purpose of a program (or process) may be achieved while loading/storing the large amount of data generated during the run time of the program in the first Gen-Z memory 120 and the second Gen-Z memory 130.

Meanwhile, according to the Gen-Z interface standard, it is possible to directly exchange data between the first Gen-Z memory 120 and the second Gen-Z memory 130 without intervention of the CPU 110. This is defined as the P2P (Point to Point) standard, in which the instruction is designed, implemented, and used. P2P communication between the CPU 110 and the Gen-Z memories 120 and 130 is also possible. This is because the CPU 110 can also act as a requester that can generate Gen-Z instructions.

According to the Gen-Z interface standard, communication between memory devices connected by P2P can transmit and execute instructions using a P2P-Core instruction set.

It should be noted that the structure of the processing apparatus 100 shown in FIG. 2 is only an example for comprehensively indicating that the first Gen-Z memory 120 and the second Gen-Z memory 130 can be used in a form of a daisy-chain connection. In actual implementation, if the desired memory capacity and the purpose of the program can be achieved only with the first Gen-Z memory 120, it will be understood that the use of the second Gen-Z memory 130 may be unnecessary.

Unlike the application combined with the CPU and the memory device described above, a device with its own computing capability, apart from the computing function of the CPU, can also be connected using the Gen-Z interface standard.

Figure 3:
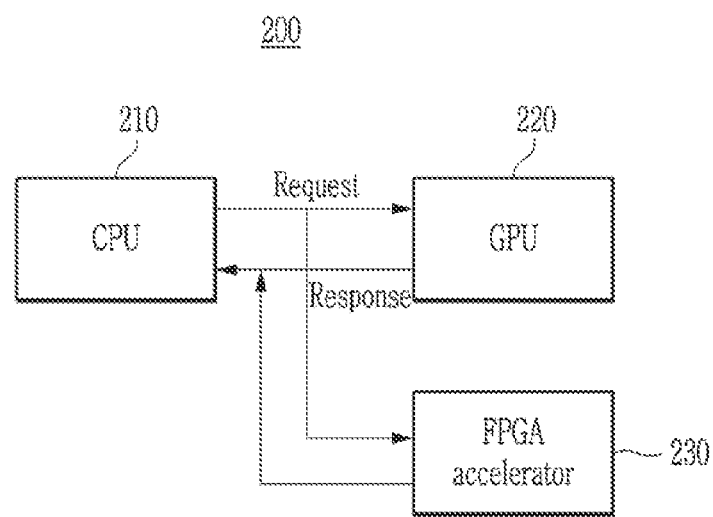
FIG. 3 is a diagram illustrating a structure of a processing apparatus with an interface standard according to another embodiment of the present disclosure.

FIG. 3 is a diagram illustrating a structure of a processing apparatus with an interface standard according to another embodiment of the present disclosure.

Specifically, in FIG. 3, a case in which a device having its own computing capability is connected using a Gen-Z interface is shown. The device with its own computing capability includes a graphics processing unit (GPU) that can calculate graphics data differently from a memory device storing data manually, and an FPGA accelerator that implements high-speed operation required by a CPU with dedicated hardware logic and the like.

The processing apparatus 200 according to another exemplary embodiment of the present invention uses a Gen-Z interface, and as shown in FIG. 3, includes a CPU 210, a GPU 220, and an FPGA accelerator 230. The CPU 210 becomes a requester, while the GPU 220 and the FPGA accelerator 230 become a responder.

When the computing element such as the CPU 210, the GPU 220, and the FPGA accelerator 230 has a connection structure as shown in FIG. 3, mutual instruction exchange can be achieved by using a P2P-Coherency instruction according to the Gen-Z interface standard.

In order to process various workloads and perform Internet services, first, when receiving data input from a user and running application software for performing a predetermined service, if a device using the Gen-Z interface standard is used, the internal resources of the Gen-Z interface-based device are exhausted due to the instantaneous increase of the workload by service users, and thus a saturation situation may occur instantaneously and congestion may occur in terms of packets. The Gen-Z interface standard only mentions very limited rules for a congestion control method.

An embodiment of the present disclosure provides a method for more efficiently controlling congestion based on the Gen-Z interface standard. To this end, the requester side includes packet processing priority information in a packet and then provides the packet. Accordingly, when congestion occurs inside the device of the Gen-Z interface standard and the service cannot be provided, the Gen-Z switch device or the responder inside the device processes the packet by referring to the packet processing priority information. Accordingly, the packet having the highest priority, such as a packet in which real-time performance is important or a financial encryption packet, is processed first, and then the packets of low priority are sequentially processed, thereby the service quality can be satisfied and congestion can be alleviated or resolved.

A packet according to the Gen-Z interface standard, that is, a Gen-Z packet, includes a request packet and a response packet for exchanging messages with each other. In the Gen-Z interface standard, the characteristics of the request packet are classified into a low-latency domain and a non-low-latency domain. The low-latency domain is a device level that requires a low-latency response, that is, the fastest response, and the non-low-latency domain is a device level that allows a general queuing delay, that is, a packet delay. However, because such a domain classification method is a device-level congestion control method, there is a structural limitation to be used as a delicate packet-level delay time control method.

In an embodiment of the present disclosure, when a low-latency domain packet is generated at the upper end of Gen-Z and requested to be processed, if, due to the saturation of the physical bandwidth within the Gen-Z device or a full queue of the receiving side, a congestion situation occurs, it is intended to efficiently handle it.

According to the Gen-Z interface standard, in the case of OpClass packets, when the packet sent from the requester arrives at the responder via the Gen-Z switch, if the waiting queue on the responder side is full and then can no longer accommodate the requester's request, the responder sets an explicit congestion notification (ECN) field indicating that congestion has occurred, and transmits a response packet including the ECN field to the requester. Upon receiving the ECN field, the requestor sets a deadline value.

Figure 4:
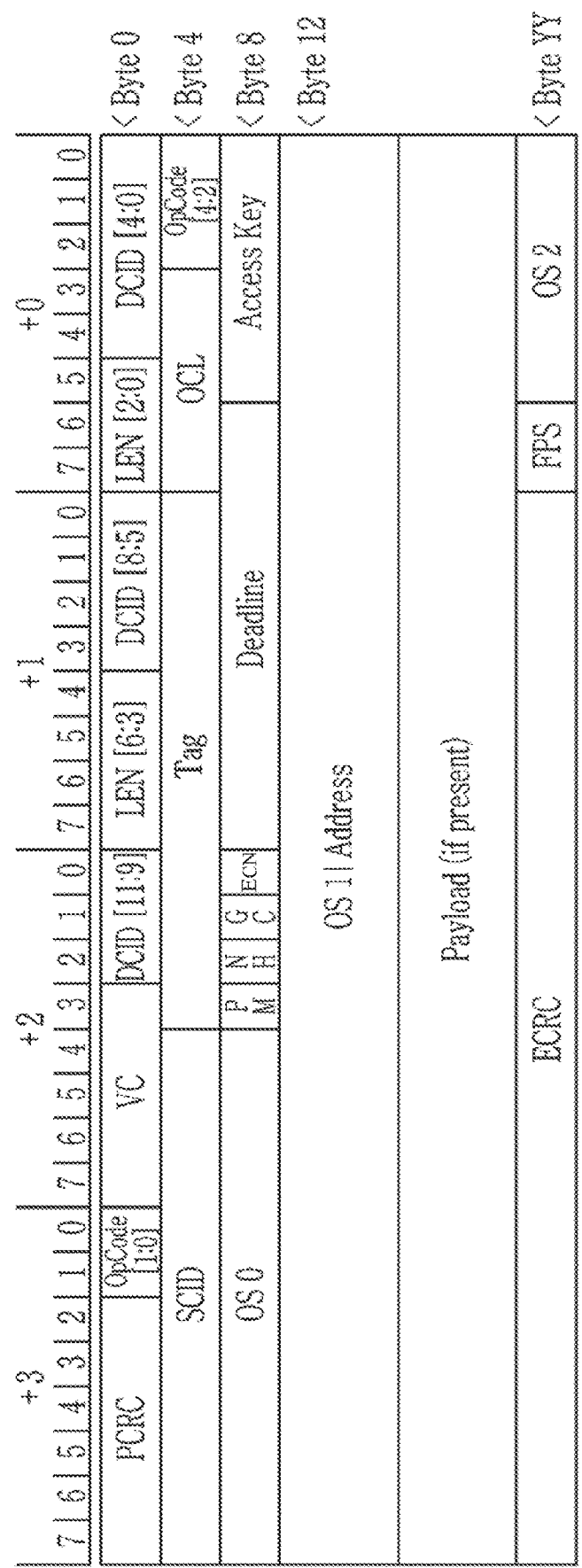
FIG. 4 is an exemplary diagram illustrating an ECN field.
Figure 5:
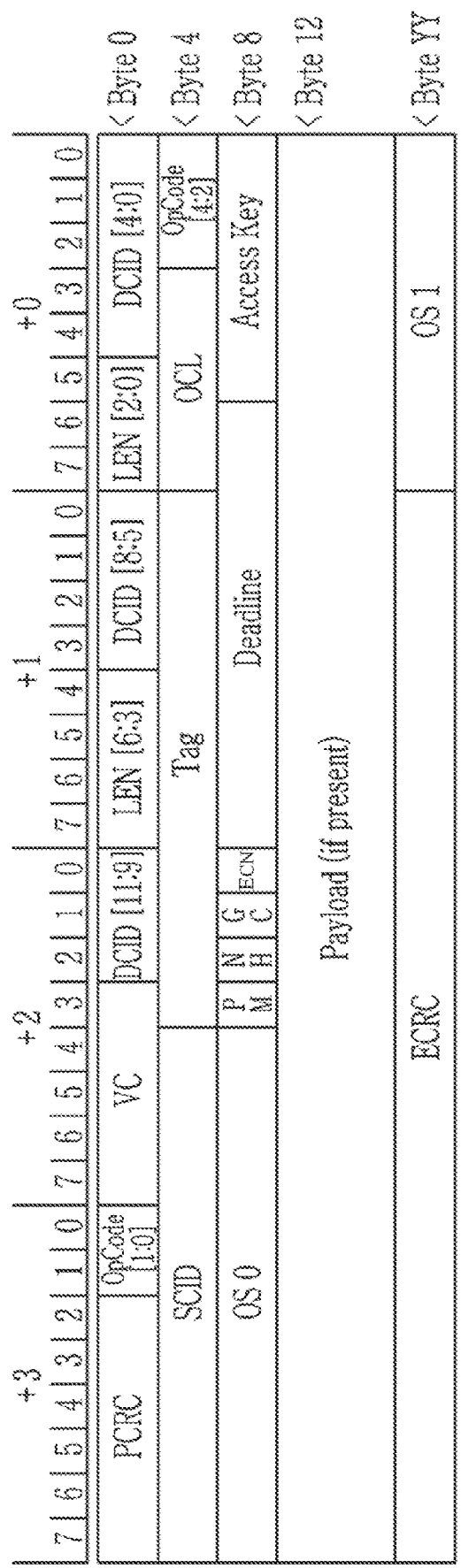
FIG. 5 is an exemplary diagram illustrating a deadline field.

FIG. 4 is an example diagram illustrating an ECN field, and FIG. 5 is an example diagram illustrating a deadline field.

According to the Gen-Z interface standard, the responder adds the ECN field indicating that congestion has occurred in a middle part of the response packet having the structure illustrated in FIG. 4 (in this case, the value of the ECN field may be "1" and ECN=0 may indicate that there is no congestion), and then transmits the response packet to the requester. The requester checks the ECN field of the received packet, sets a deadline value, records the set deadline value in the deadline field of the structure as illustrated in FIG. 5, and sends a control packet including this to the responder.

Also, the requestor may control the congestion situation by starting retransmission according to a packet injection delay table (PIDT) value. At this time, the requestor refers to the PIDT to adjust a packet injection rate, and the PIDT determines a packet injection method by referring to the contents of a congestion management structure (CMS) table.

The packet injection rate is adjusted when one of the following congestion events is detected or received.

Timeout event: a case in which the same packet is retransmitted twice or more because congestion has already occurred on the responder side Explicit congestion notification: a case in which the requestor receives ECN=1

High-latency event: a case in which the packet injection rate is reduced due to a situation in which a packet exchange time having a significantly larger value than a value previously calculated by the requester for packet transmission occurs No congestion notification: a case in which the requester receives ECN=0, recognizes that there is no congestion, and increases the packet injection rate For such various types of congestion events, active congestion control cannot be achieved by simply processing the congestion events based on only the deadline value. Meanwhile, according to the Gen-Z interface standard, as shown in Tables 1, 2, and 3 below, standards for selecting a congestion control method are defined according to the set values of the CMS table, Congestion CAP1, and Congestion CAP1 Control.

TABLE 1

Congestion Management Structure Fields

| Field Name | Size (bits) | MO | Access | Description |
|---|---|---|---|---|
| Version (Vers) | 4 | M | RO | Structure Version = 0 × 1 |
| Congestion CAP1 | 16 | M | RO | See Congestion CAP 1 |
| Congestion CAP1 Control | 16 | — | — | See Congestion CAP 1 Control |
| Congestion Sampling Window | 32 | M | RW | This field is configured with the number of ns and a component shall wait before adjusting the PIDT index used to control packet injection rate. The field should be set to at least the minimum round-trip latency between a Requester and any peer Responder. |
| Packet Generation Delay | 16 | M | RO | This field indicates the number of ps required to generate and transmit a 16-byte explicit OpClass packet on any component interface. |
| Vendor-defined PTR | 32 | O | RO | If non-Null, then the component supports component-level and vendor-defined level congestion management. This field shall point to a Vendor-Defined Structure. |

MO: Mandatory(M)/Optional(O)
RO: Read Only
RW: Read Write

TABLE 2

Congestion CAP 1

| Bit Position | Access | Description |
|---|---|---|
| 0 | RO | Resource Congestion Management Support |
| 1 | RO | Vendor-defined Congestion Management Support |
| 15:2 | — | Reserved |

TABLE 3

Congestion CAP 1 Control

| Bit Position | Access | Description |
|---|---|---|
| 2:0 | RW | Congestion Management Control-By default, congestion management shall be performed at the component level, If a component supports Resource-based congestion management, then congestion management may be performed at the component-level or at the Resource Type level. If a component supports Vendor-defined-based congestion management, then congestion management may be performed at the component-level or at a vendor-defined level. 0 × 0 Component (0b00) 0 × 1-Resource (0b01) 0 × 2-Vendor-defined (0bl0) 0 × 3-0 × 7-Reserved |

TABLE 3-continued

Congestion CAP 1 Control

| Bit Position | Access | Description |
|---|---|---|
| 3 | RW | Strict increment Mode Control 0b-Vendor-defined 1b-Strict By 1 Adjustment |
| 15:4 | — | Reserved |

The component-level and resource-level congestion control methods based on Tables 1 to 3 above means that for each device constituting the Gen-Z system, congestion control is performed at the resource level of the device.

In the embodiment of the present disclosure, unlike the component-level and resource-level congestion control, priority is assigned according to the nature of the actual inner packet of the Gen-Z packet, and packet level congestion control is performed according to the assigned priority.

To this end, in the embodiment of the present disclosure, among the congestion management structure (CMS) fields of Table 1, the value of the Congestion CAP1 field is set to a value "1" that supports vendor-defined congestion control based on Table 2, and the value of the bit position (0~2) among the values of the Congestion CAP1 Control field is set to "0x2" so that congestion control is executed according to the vendor-defined value based on Table 3.

Figure 6:
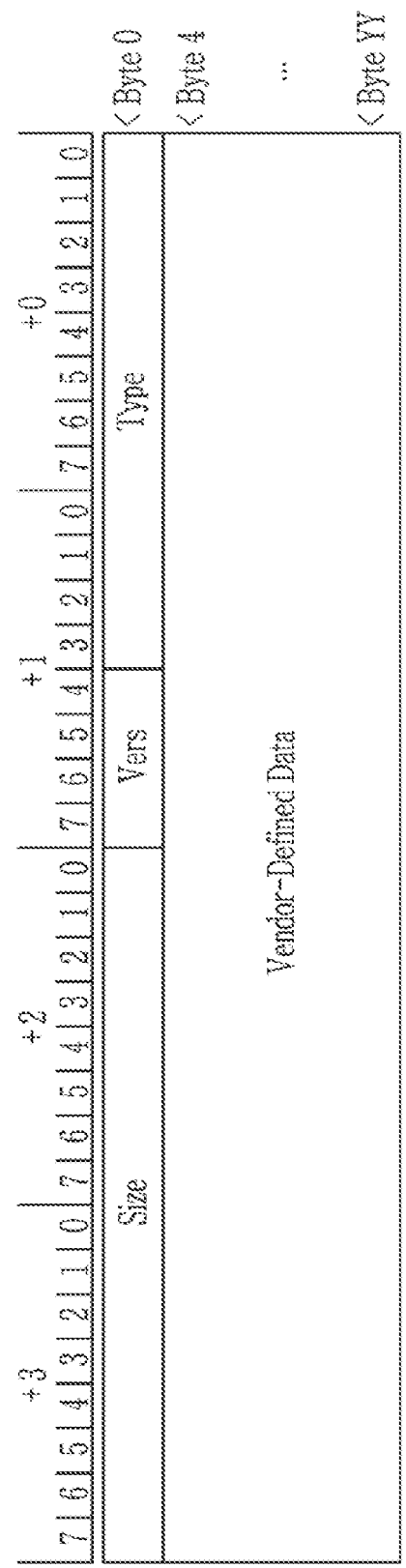
FIG. 6 is an example diagram illustrating a format of a vendor-defined structure field according to an embodiment of the present disclosure.

FIG. 6 is an exemplary view showing the format of a vendor-defined structure according to an embodiment of the present disclosure.

As the value of the bit positions (0 to 2) among the values of the Congestion CAP1 Control field is set to "0x2", as illustrated in FIG. 6, congestion control is performed according to vendor-defined data.

In this way, when values of two fields (the value of the Congestion CAP1 field and the value of the Congestion CAP1 Control field) are set, the value of the Vendor-defined PTR field among the CMS fields of Table 1 is finally set to indicate the offset value of the position in which the vendor-defined congestion control method is defined. That is, it can be set inside the response packet (e.g., explicit OpClass packet).

Where the vendor-defined congestion control method is defined, that is, a vendor-defined structure field (see FIG. 6), is shown in Table 4 below.

TABLE 4

Vendor-Defined Structure Fields

| Filed Name | Size (bits) | MO | Access | Description |
|---|---|---|---|---|
| Version (Vers) | 4 | M | RO | Structure Version = 0 × 1 |
| Vendor-defined Data | — | — | — | Vendor-defined layout and access rules. |

Meanwhile, in an embodiment of the present disclosure, a vendor-defined structure field for congestion control of a Gen-Z interface may be configured as shown in Table 5 below.

TABLE 5

Vendor-Defined Structure Fields for congestion control according to an embodiment of the present disclosure

| Type | Vers | Size | Vendor-Defined Data | |
|---|---|---|---|---|
| Vendor-defined prionty control = 0bXXXX | 0 × 1 | Variable | Vendor-defined priority enable | Vendor-defined priority |
| | | | 0b = 1 | 0b = 111 |
| | | | 0b = 1 | 0b = 110 |
| | | | 0b = 1 | 0b = 101 |
| | | | 0b = 1 | 0b = 100 |
| | | | 0b = 1 | 0b = 011 |
| | | | 0b = 1 | 0b = 010 |
| | | | 0b = 1 | 0b = 001 |
| | | | 0b = 1 | 0b = 000 |

In Table 5, the type field is defined as a vendor-defined priority control, and is a field that can be defined and used within a 12-bit value. For example, it can be defined as "0xFF0".

The version (Vers) field is a 4-bit value and is defined as "0x1" based on Table 4.

The vendor-defined data field defines a packet priority value so that priority-based packet processing is performed for congestion control in the Gen-Z interface according to an embodiment of the present disclosure. This field may consist of a vendor-defined priority enable bit for priority control and a vendor-defined priority field. Herein, an example in which the vendor-defined data field consists of only 4 bits is exemplified, but the present disclosure is not limited thereto. For example, the number of bits constituting the vendor-defined data field can be extended within the field length of the vendor-defined data. In addition, if a packet has a high value of the vendor-defined priority field in the vendor-defined data field, the service quality experienced by the user may be improved by preferentially processing the corresponding packet.

Therefore, when a packet including a vendor-defined data field having the above high value is received, the receiving side (e.g., Gen-Z switch or Gen-Z responder) parses the value of the above field to know the priority processing information of the packet requested by the requester side, and as a result, it is possible to recognize in advance packet information for which priority processing is to be performed after a congestion situation. Accordingly, the quality of the corresponding service can be secured and service satisfaction can be improved. Note that, in the embodiment of the present disclosure, it is not specified which type of packet should have a higher priority.

Meanwhile, in an embodiment of the present disclosure, in order to perform packet-level congestion control according to priority, the following method may be used alternatively.

According to the Gen-Z interface standard, the Gen-Z packet uses a latency domain value among the table format values of the PEER-ATTR table when low-latency packet transmission is required. A value of the low-latency (LL) domain field is set to "0b" to indicate low-latency packet transmission, and when low-latency packet transmission is not required, a value of the non-low-latency (NLL) domain field is set to "1b". However, these settings are to set the delay characteristics at the requestor and responder device level. On the contrary, another embodiment of the present disclosure provides a method capable of handling packet-level delay control.

In the Gen-Z interface standard, unless there is a congestion situation (e.g., ECN=0b), it means a situation in which the bandwidth on the data path of the Gen-Z fabric has a processing margin and the queue on the responder side is not full. If it is a congestion situation (e.g., ECN=1b), it means a situation in which the bandwidth on the data path is saturated or the responder's queue is full.

Figure 7:
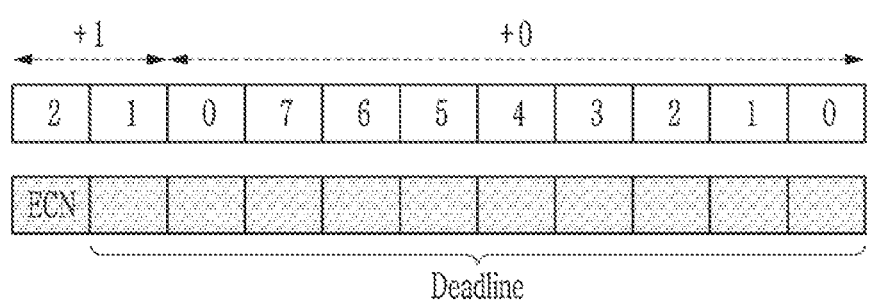
FIG. 7 is a diagram illustrating widths of an ECN field and a deadline field.

FIG. 7 is a diagram illustrating widths of an ECN field and a deadline field.

According to the Gen-Z interface standard, as shown in FIG. 7, the width of the deadline field is 10 bits, and when the ECN field has a value of 1, if the transmission of the corresponding packet fails, it is specified that the value of the deadline field has a continuously increasing value. Since the width of the deadline field is 10 bits, the value of the deadline field can be up to 1023. However, in practical use, it is inappropriate to repeatedly wait for retransmission until 1023 packet retransmissions are made, and it can be predicted that excessive waiting for retransmission leads to a significant delay effect of the service in terms of experience of the user.

Therefore, in the embodiment of the present disclosure, the value of the deadline field is not simply used as a counter value of the number of retransmissions, but is actually divided into a value of a priority field and a value of a deadline field having an original meaning.

To this end, in an embodiment of the present disclosure, a packet processing method according to priority follows the following principle.

1) When there is no congestion, low-latency (LL) packets and non-low-latency (NLL) packets are processed according to the Gen-Z interface standard.

2) In case of congestion, the following packet processing method is followed.

2-1) Low-latency (LL) packets are always processed in preference to non-low-latency (NLL) packets.

2-2) Priority between low-latency (LL) packets is determined by the priority field.

When processing a packet according to an embodiment of the present disclosure, based on the above principle, when a priority enable bit is used in the priority field and when the priority enable bit is not used in the priority field, the congestion control is performed so that priority-based packet processing is performed respectively, as follows.

First, when the priority enable bit is used in the priority field, congestion control is performed using the ECN field, the priority enable bit, and a priority encoding bit.

Figure 8:
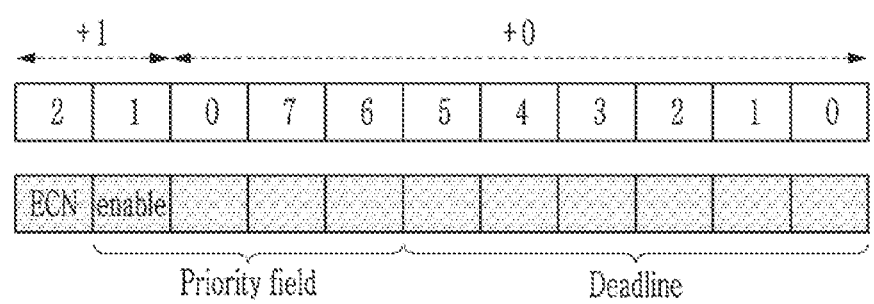
FIG. 8 is a diagram illustrating a configuration of a deadline field according to an embodiment of the present disclosure.

FIG. 8 is a diagram illustrating a configuration of a deadline field according to an embodiment of the present disclosure.

As shown in FIG. 8, in the embodiment of the present disclosure, when a priority enable bit is used, the existing deadline field is divided into a priority field and a deadline field having an original meaning, and some bits of the priority field are used as priority enable bits, and the remaining bits are used as priority encoding bits indicating priority.

The deadline field according to an embodiment of the present disclosure having such a structure may be used as shown in Table 6 below.

TABLE 6

Method 1 for using the deadline filed of the Gen-Z interface
standard according to an embodiment of the present disclosure

| Priority level | Priority enable 1 bit | Priority encoding 3 bits | Deadline 6 bits | Implementation example |
|---|---|---|---|---|
| Most high | 0b1 | 0b111 | 0bxxxxxx | financial data packet |
|  | 0b1 | 0b110 | " | real time control packet (AI car control, remote control etc) |
|  | 0b1 | 0b101 | " | video service packet |
|  | 0b1 | 0b100 | " | audio service packet |
| Medium | 0b1 | 0b011 | " | social media packet |
|  | 0b1 | 0b010 | " | machine learning |
|  | 0b1 | 0b001 | " | data mining |
| Most low | 0b1 | 0b000 | " | software-as-a-service |

The ECN field indicates whether there is congestion, and the 10-bit deadline field according to the Gen-Z interface standard is divided into a 4-bit priority field and a 6-bit deadline field, and a predetermined bit of the priority field, for example, 1 bit, is used as a priority enable bit indicating priority enable, and the remaining bits of the priority field, for example, 3 bits, are used as priority encoding bits. At this time, as shown in Table 6, the values of the priority field and the deadline field are different for each service.

Also, when the priority enable bit is not used in the priority field, congestion control is performed using the ECN field and the priority encoding bit.

In this case, in the deadline field structure as shown in FIG. 8, the value of the priority field is used only as the priority encoding bit.

The deadline field according to an embodiment of the present disclosure having such a structure may be used as shown in Table 7 below.

TABLE 7

Method 1 for using the deadline filed of the Gen-Z interface
standard according to an embodiment of the present disclosure

| Priority level | Priority encoding 3 bit | Deadline 7 bit | Implementation example |
|---|---|---|---|
| Most high | 0b111 | 0bxxxxxxx | real time control packet (AI car control, remote control, etc.) |
|  | 0b110 | " | financial data packet |
|  | 0b101 | " | video service packet |
|  | 0b100 | " | other services |
|  | 0b011 | " | other services |
|  | 0b010 | " | other services |
|  | middle omission | " | middle omission |
| Medium | 0b111 | " | other services |
|  | 0b110 | " | other services |
|  | 0b101 | " | other services |
|  | 0b100 | " | audio service packet |
|  | 0b011 | " | social media packet |
|  | 0b010 | " | machine learning |
|  | 0b001 | " | data mining |
| Most low | 0b000 | " | software-as-a-service |

The ECN field indicates whether there is congestion, and the 10-bit deadline field according to the Gen-Z interface standard is divided into a 3-bit priority field and a 7-bit deadline field, and the priority field is used as a priority encoding bit. At this time, as shown in Table 7, the values of the priority field and the deadline field are different for each service.

When the length of the deadline field is not sufficient, as described above, only the value of the ECN field and the value of the priority encoding bit may be used. Note that in this case, the receiving side (Gen-Z switch or responder) receiving the corresponding packet should know in advance that the priority enable bit is not used.

The priority setting for each service described in Tables 6 and 7 is merely an example, and may be redefined as necessary, and the present disclosure is not limited to the above.

In addition, the OpCode priority encoding numbers described in Tables 6 and 7 are examples, and different OpCode priority encoding numbers may be assigned to this item, and the present disclosure is not limited to those described above.

The fact that the actual implementation of the priority-based congestion control method based on the Gen-Z interface standard presented in this disclosure can be implemented using a field programmable gate array (FPGA) or a dedicated chipset for implementing the Gen-Z interface with a hardware description language (HDL) would be natural for those skilled in the art.

According to the embodiments of the present disclosure, when data for a data-centric workload is processed using the Gen-Z interface standard, data packets are processed while moving to each component in the Gen-Z fabric. At this time, when congestion does not occur, that is, when there is a surplus in the internal bandwidth or work queue of the Gen-Z fabric, the packet is processed in the manner defined in the Gen-Z interface standard. On the other hand, if congestion occurs during data packet movement within the Gen-Z fabric, packet-level congestion control is performed. To this end, the packet is transmitted based on the priority given according to the nature of the packet, and the receiving side processes the received packet based on the priority information included in the packet. As a result, according to an embodiment of the present disclosure, a packet priority-based congestion control method compatible with the Gen-Z interface standard is implemented.

When the congestion control method according to an embodiment of the present disclosure is applied to a processing device, the processing device may operate as follows.

For convenience of description, as shown in FIGS. 1 to 3, when transmitting and receiving packets using the Gen-Z interface, the requestor is called a first device and the responder is called a second device.

Figure 9:
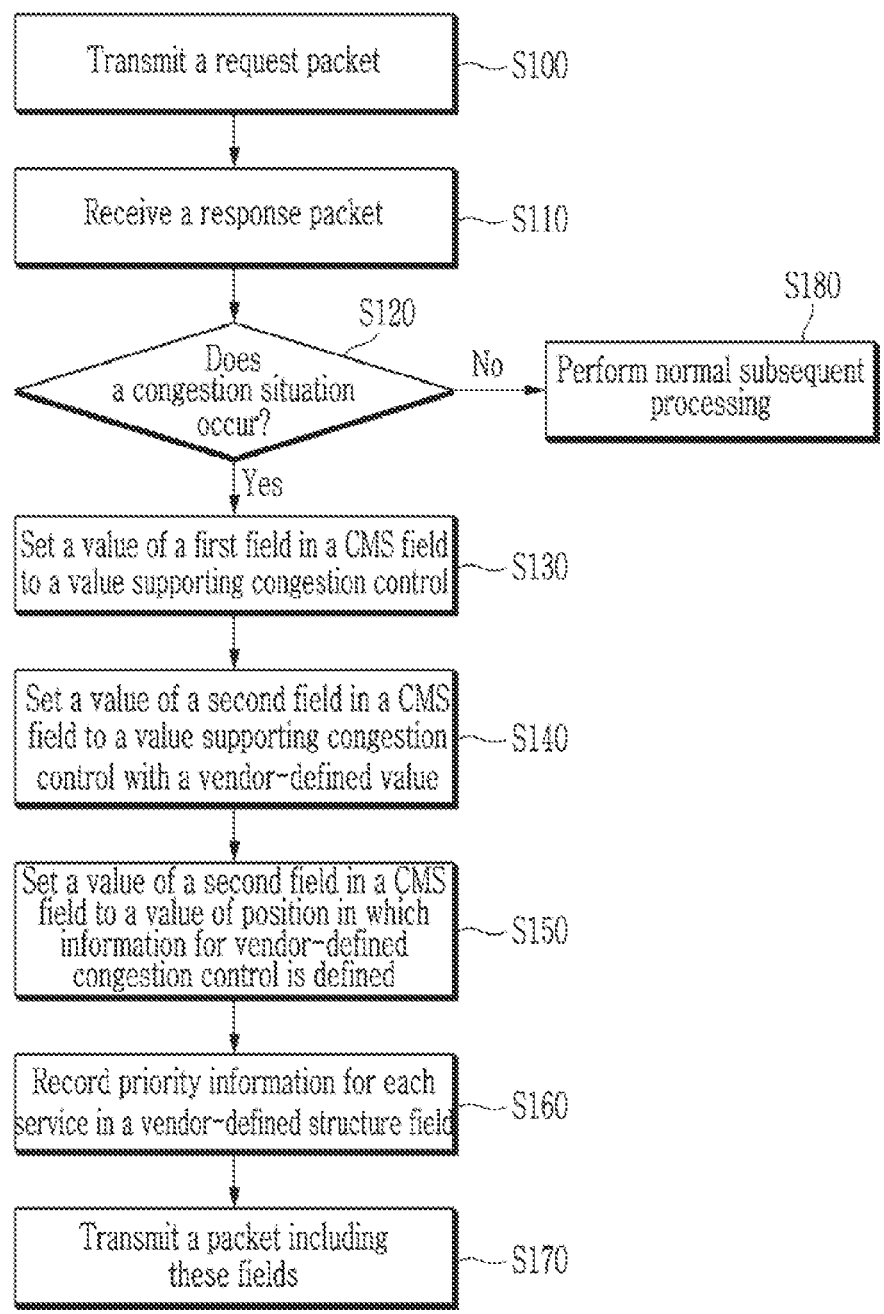
FIG. 9 is a flowchart of a congestion control method according to a first embodiment of the present disclosure.

FIG. 9 is a flowchart of a congestion control method according to a first embodiment of the present disclosure.

In the first embodiment of the present disclosure, a vendor-defined structure field is used for congestion control.

As shown in FIG. 9, the first device transmits a request packet to the second device (S100). When a congestion situation occurs in receiving the request packet, the second device activates the value of the field indicating the congestion situation, that is, the value of the ECN field, and transmits a response packet including the ECN field (e.g., ECN=1) of the activated value to the first device. On the other hand, if the congestion situation does not occur, the response packet is transmitted to the first device without activating the value of the ECN field (e.g., ECN=0).

When receiving the response packet from the second device (S110), the first device determines whether a congestion situation occurs (S120). For example, by checking the ECN field of the response packet, if the value of the ECN field is activated, it is determined that the congestion situation has occurred, and if the value is not activated, it is determined that the congestion situation has not occurred.

When the congestion situation occurs, the first device generates packet priority processing information for congestion control. To this end, a predetermined field among fields constituting a field for congestion control according to the Gen-Z interface standard is set as values for vendor-defined congestion control. Specifically, among the congestion management structure (CMS) fields according to the Gen-Z interface standard, the value of the Congestion CAP1 field (referred to as the first field for convenience of description) is set to a value of "1" supporting vendor-defined congestion control (S130), and among the values of the Congestion CAP1 Control field (referred to as the second field for convenience of explanation), the value of the bit position (0~2) is set to "x2" so that congestion control is executed according to the vendor-defined value (S140). Then, the value of the vendor-defined PTR of the CMS field (referred to as a third field for convenience of description) is set to the value of the vendor-defined structure field where information for vendor-defined congestion control is defined (S150).

Then, priority information is recorded in the vendor-defined structure field (S160). For example, as in Table 5 described above, a packet priority value is recorded in the vendor-defined data field of the vendor-defined structure field for priority-based packet processing. That is, the vendor-defined priority enable bit of the vendor-defined data field is activated (e.g., set to "1"), and a value indicating priority is recorded in the vendor-defined priority field of the vendor-defined data field. Here, as the value of the vendor-defined priority field is higher, it indicates that the corresponding packet should be preferentially processed.

Thereafter, the first device transmits a packet including these fields to the second device (S170). That is, as described above, a packet including the CMS field in which predetermined fields are set to values for vendor-defined congestion control and the vendor-defined structure field in which priority information is recorded is transmitted to the second device. Accordingly, the second device checks the priority information of the corresponding packet based on the above fields included in the received packet, and processes the corresponding packet according to the priority information.

Meanwhile, in step S120, when a congestion situation does not occur, the first device performs normal subsequent processing according to the response packet (S180).

Figure 10:
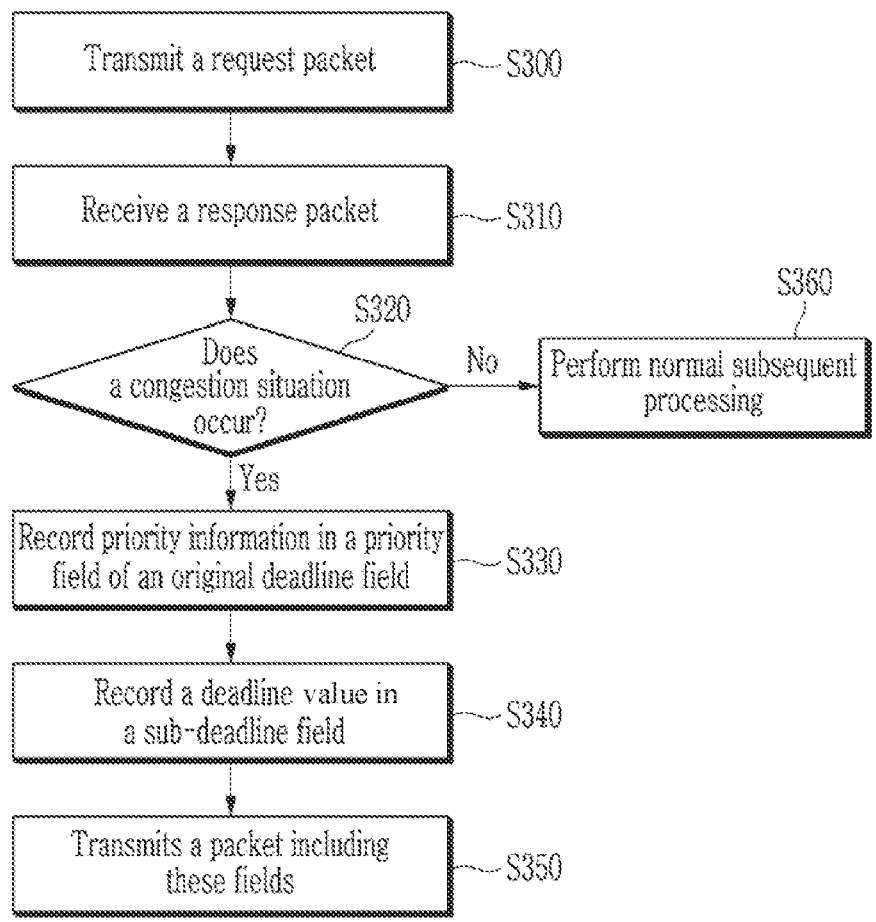
FIG. 10 is a flowchart of a congestion control method according to a second embodiment of the present disclosure.

FIG. 10 is a flowchart of a congestion control method according to a second embodiment of the present disclosure.

In the second embodiment of the present disclosure, a deadline field is used for congestion control.

As shown in FIG. 10, the first device transmits a request packet to the second device (S300). When a congestion situation occurs in receiving the request packet, the second device activates the value of the field indicating the congestion situation, that is, the value of the ECN field, and transmits a response packet including the ECN field (e.g., ECN=1) of the activated value to the first device. On the other hand, if congestion does not occur, the response packet is transmitted to the first device without activating the value of the ECN field (e.g., ECN=0).

When receiving the response packet from the second device (S310), the first device determines whether a congestion situation occurs (S320). For example, by checking the ECN field of the response packet, if the value of the ECN field is activated, it is determined that the congestion situation has occurred, and if the value is not activated, it is determined that the congestion situation has not occurred.

When a congestion situation occurs, the first device generates packet priority processing information for congestion control. To this end, priority information for packet processing is generated using a deadline field among fields according to the Gen-Z interface standard. Specifically, according to the second embodiment of the present disclosure, the deadline field according to the Gen-Z interface standard is divided into a priority field and a deadline field. For convenience of explanation, the deadline field according to the Gen-Z interface standard is called an original deadline field, and a deadline field included in the original deadline field is called a sub-deadline field. That is, according to the second embodiment of the present disclosure, the original deadline field is divided into a priority field and a sub deadline field.

The priority field of the original deadline field is divided into a priority enable bit and a priority encoding bit. In this state, different priority information according to the service is recorded in the priority encoding bit of the priority field, and the priority enable bit is activated. Meanwhile, the priority field may include only the priority encoding bit. In this case, different priority information according to the service is recorded in the priority encoding bit of the priority field (S330). Meanwhile, a deadline value is recorded in the sub-deadline field of the original deadline field (S340).

Thereafter, the first device transmits a packet including these fields to the second device (S350). That is, a packet including the original deadline field as described above is transmitted to the second device. Accordingly, the second device checks the priority information of the corresponding packet recorded in the priority field of the original deadline field included in the received packet, and processes the corresponding packet according to the priority information.

Meanwhile, in step S320, when a congestion situation does not occur, the first device performs a normal subsequent processing according to the response packet (S360).

Figure 11:
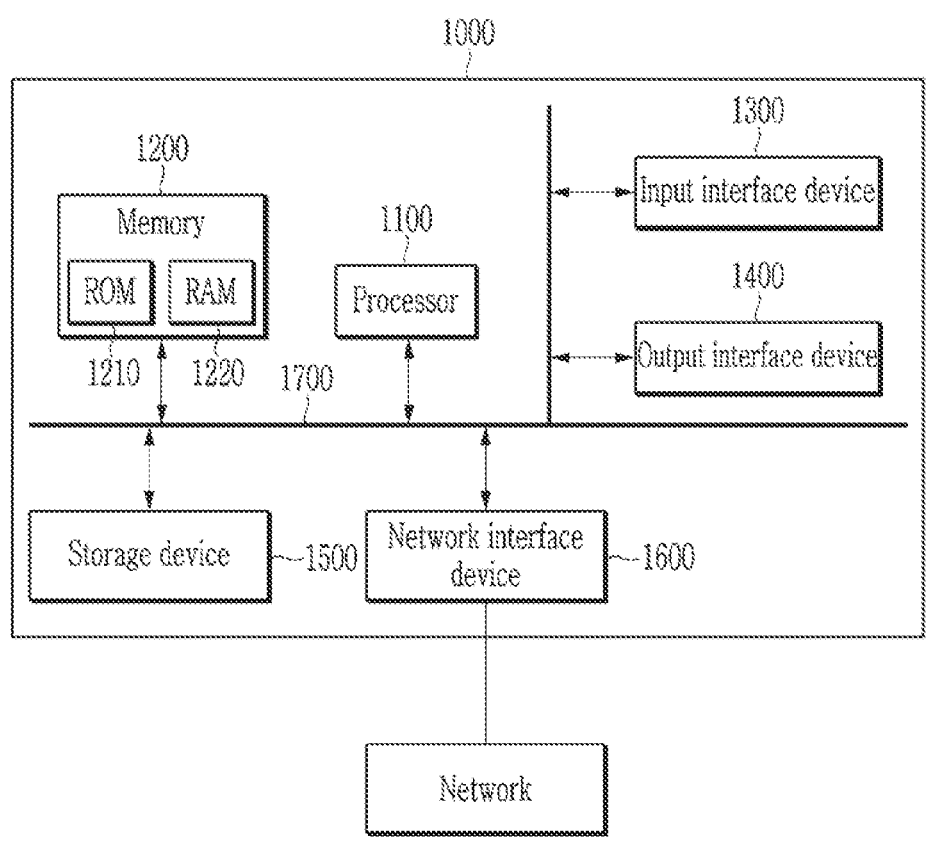
FIG. 11 is a structural diagram illustrating a computing device for implementing a congestion control method according to an embodiment of the present invention.

FIG. 11 is a structural diagram illustrating a computing device for implementing a congestion control method according to an embodiment of the present invention.

As shown in FIG. 11, the congestion control method according to an embodiment of the present invention may be implemented using a computing device 1000.

The computing device 1000 may include at least one of a processor 1100, a memory 1200, an input interface device 1300, an output interface device 1400, a storage device 1500, and a network interface device 1600. Each of the components may be connected by a bus 1700 to communicate with each other. In addition, each of the components may be connected through a separate interface or a separate bus with the processor 1100 as the center instead of the common bus 1700.

The processor 1100 may be implemented in various types such as an application processor (AP), a central processing unit (CPU), a graphics processing unit (GPU), and the like, and may be any semiconductor device that executes an instruction stored in the memory 1200 or the storage device 1500. The processor 1100 may execute a program command stored in at least one of the memory 1200 and the storage device 1500. The processor 1100 may be configured to implement the functions and methods described with reference to FIGS. 1 to 10 above. In addition, the processor 1100 may communicate with other processors through the bus 1700, or may communicate with other devices on a network through the network interface device 1600.

The memory 1200 and the storage device 1500 may include various types of volatile or non-volatile storage media. For example, the memory may include a read-only memory (ROM) 1210 and a random access memory (RAM) 1220. In an embodiment of the present invention, the memory 1200 may be located inside or outside the processor 1100, and the memory 1200 may be connected to the processor 1100 through various known means.

The input interface device 1300 is configured to provide input data to the processor 1100, and the output interface device 1400 is configured to output data from the processor 1100.

The network interface apparatus 1600 may transmit or receive signals with other devices through a wired network or a wireless network.

The computing device 1000 having such a structure is called a device, and may implement a congestion control method according to an embodiment of the present invention.

In addition, at least a part of the congestion control method according to an embodiment of the present invention may be implemented as a program or software executed in the computing device 1000, and the program or software may be stored in a computer-readable medium.

In addition, at least a part of the congestion control method according to an embodiment of the present invention may be implemented as hardware capable of being electrically connected to the computing device 1000.

According to an embodiment of the present disclosure, efficient congestion control based on packet priority is performed while following the standard defined in the Gen-Z interface.

In addition, when processing data for a data-centric workload, it is possible to give priority to the processing of service packets according to the characteristics of individual services. In addition, if the Gen-Z fabric is saturated, it is possible to solve the phenomenon of excessive service delay by using priority information to process data packets by priority.

Further, in addition to the above services, a memory pool using the Gen-Z interface is used even when various machine learning, deep learning, and super-scale variable operation simulation programs are run, so that the congestion control method according to an embodiment of the present disclosure can be used. As a result, even if a large amount of memory pool access data occurs when running software, the execution speed can be guaranteed by increasing the priority of the Gen-Z packet generated by the software. Therefore, the service quality of server applications using Gen-Z interface compatible hardware can be improved.

The embodiments of the present disclosure are not implemented only through the apparatus and/or method described above, but may be implemented through a program for realizing a function corresponding to the configuration of the embodiment of the present disclosure, and a recording medium in which the program is recorded. This implementation can also be easily performed by expert person skilled in the technical field to which the present disclosure belongs from the description of the above-described embodiments.

The components described in the embodiment s may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the embodiment s may be implemented by software, and the software may be recorded on a recording medium. The components, functions, and processes described in the embodiment s may be implemented by a combination of hardware and software.

The method according to embodiment s may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages, and may be deployed in any form including a stand-alone program or a module, a component, a subroutine, or other units appropriate for use in a computing environment. A computer program may be deployed to be executed on one computer or on multiple computers at one site or distributed across multiple sites and interconnected by a communication network. Processors appropriate for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic disks, magneto-optical disks, or optical disks. Examples of information carriers appropriate for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc., and magneto-optical media such as a floptical disk, and a read only memory (ROM), a random access memory (RAM), a flash memory, an erasable programmable ROM (EPROM), and an electrically erasable programmable ROM (EEPROM), and any other known computer readable medium. A processor and a memory may be supplemented by, or integrated with, a special purpose logic circuit. The processor may run an operating system (OS) and one or more software applications that run on the OS. The processor device also may access, store, manipulate, process, and create data in response to execution of the software. For the purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implementations, but it should be understood that the details do not limit any disclosure or what is claimable in the specification but rather describe features of the specific embodiment. Features described in the specification in the context of individual embodiment s may be implemented as a combination in a single embodiment. In contrast, various features described in the specification in the context of a single embodiment may be implemented in multiple embodiment s individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood that the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described embodiment s in all embodiment s, and it should be understood that the above-described program components and apparatuses may be incorporated into a single software product or may be packaged in multiple software products. It should be understood that the embodiment s disclosed herein are merely illustrative and are not intended to limit the scope of the disclosure. It will be apparent to one of ordinary skill in the art that various modifications of the embodiment s may be made without departing from the spirit and scope of the claims and their equivalents.

What is claimed is:

1. A method for controlling congestion in an environment in which a first device and a second device transmit and receive packets based on a generation Z (Gen-Z) interface, comprising:
   receiving, by the first device, from the second device, a second packet that is a response to a first packet transmitted to the second device;
   recording, by the first device, priority information of a packet in a first field and, recording a deadline value in a second field of the same packet, among fields according to the Gen-Z interface, when the second packet indicates a congestion situation exists; and
   transmitting, by the first device, the packet including the priority information as a third packet to the second device.

2. The method of claim 1, wherein
   the recording of priority information comprises recording the priority information in a vendor-defined structure field according to the Gen-Z interface standard.

3. The method of claim 2, wherein
   the recording of priority information comprises:
   recording that congestion control is performed according to a vendor-defined value in congestion management structure (CMS) fields according to the Gen-Z interface standard; and
   recording the priority information in the vendor-defined structure field.

4. The method of claim 3, wherein
   the recording in which that congestion control is performed comprises:
   setting a value of a Congestion CAP1 field among the CMS fields to a value supporting vendor-defined congestion control;
   setting a value of a predetermined bit of a Congestion CAP1 Control field among the CMS fields to a value for executing congestion control according to a vendor-defined value; and
   setting a value of vendor-defined PTR among the CMS fields to a value of the vendor-defined structure field in which information for vendor-defined congestion control is defined.

5. The method of claim 2, wherein
   the vendor-defined structure field includes a vendor-defined data field, and the vendor-defined data field includes a vendor-defined priority enable bit and a vendor-defined priority field.

6. The method of claim 5, wherein
   a value indicating priority for each service is recorded in the vendor-defined priority field, and
   the vendor-defined structure field additionally includes a type field indicating type information and a size field indicating a size.

7. The method of claim 1, wherein
   the priority information is recorded in a deadline field according to the Gen-Z interface standard; and wherein,
   the first field includes a priority enable bit and a priority encoding bit indicating the priority.

8. The method of claim 7, wherein
   the recording of priority information comprises:
   recording the priority information in the first field of the deadline field; and
   recording a deadline value in the second field of the deadline field.

9. The method of claim 8, wherein
   the recording the priority information in the first field comprises
   activating the priority enable bit and using remaining bits of the first field as priority encoding bits to record priority when the first field includes the priority enable bit.

10. A device in an environment in which a first device and a second device transmit and receive packets based on a generation Z (Gen-Z) interface, comprising:
    a memory; and
    a processor configured to execute an instruction stored in the memory,
    wherein the processor is configured to execute the instruction to perform operations by:
    receiving, from the second device, a second packet that is a response to a first packet transmitted to the second device;
    recording priority information of a packet in a deadline field for congestion control among fields according to the Gen-Z interface when the second packet indicates that a congestion situation occurs, the deadline field comprising a first subfield for priority information and a second subfield for a deadline value; and
    transmitting the packet including the priority information as a third packet to the second device.

11. The device of claim 10, wherein
    the processor is configured to perform recording the priority information in a vendor-defined structure field according to the Gen-Z interface standard when performing the operation of recording priority information.

12. The device of claim 11, wherein
    when performing the operation of recording priority information, the processor is configured to perform operations by:

recording that congestion control is performed according to a vendor-defined value in congestion management structure (CMS) fields according to the Gen-Z interface standard; and recording the priority information in the vendor-defined structure field.

13. The device of claim 12, wherein when performing the operation of recording that congestion control is performed, the processor is configured to perform operations by:

setting a value of a Congestion CAP1 field among the CMS fields to a value supporting vendor-defined congestion control;

setting a value of a predetermined bit of a Congestion CAP1 Control field among the CMS fields to a value for executing congestion control according to a vendor-defined value; and setting a value of Vendor-defined PTR among the CMS fields to a value of the vendor-defined structure field in which information for vendor-defined congestion control is defined.

14. The device of claim 11, wherein the vendor-defined structure field includes a vendor-defined data field, and the vendor-defined data field includes a vendor-defined priority enable bit and a vendor-defined priority field.

15. The device of claim 10, wherein when performing the operation of recording priority information, the processor is configured to perform operations by:

recording the priority information in the first subfield of the deadline field; and recording a deadline value in the second subfield of the deadline field.

16. The device of claim 14, wherein when performing the operation of recording the priority information in the first subfield, the processor is configured to perform an operation by activating the priority enable bit and using remaining bits of the first subfield as priority encoding bits to record priority when the first subfield includes the priority enable bit.

* * * * *